(12) United States Patent
Stalder et al.

(10) Patent No.: US 6,729,142 B2
(45) Date of Patent: May 4, 2004

(54) THERMAL TURBOMACHINE AND PROCESS FOR IGNITING THE THERMAL TURBOMACHINE

(75) Inventors: Marcel Stalder, Klinganu (CH); Franz Joos, Hamburg (DE)

(73) Assignee: Alstom Technology Ltd., Baden (CH)

( * ) Notice: Subject to any disclaimer, the term of this patent is extended or adjusted under 35 U.S.C. 154(b) by 37 days.

(21) Appl. No.: 10/067,284

(22) Filed: Feb. 7, 2002

(65) Prior Publication Data

US 2002/0170294 A1 Nov. 21, 2002

(30) Foreign Application Priority Data

Feb. 22, 2001 (DE) .......................... 101 08 561

(51) Int. Cl.⁷ .............................................. F02C 7/264
(52) U.S. Cl. .......................................... 60/821; 60/776
(58) Field of Search .................................. 60/821, 776

(56) References Cited

U.S. PATENT DOCUMENTS

| | | |
|---|---|---|
| 2,941,364 A | 6/1960 | Stokes |
| 2,967,224 A | 1/1961 | Irwin |
| 3,404,939 A | 10/1968 | Saha |
| 3,469,398 A * | 9/1969 | Schafer .................. 60/39.821 |
| 4,004,413 A | 1/1977 | Ueno et al. |
| 5,368,474 A | 11/1994 | Welden |
| 5,673,550 A | 10/1997 | Few et al. |
| 5,720,163 A | 2/1998 | Pfefferle et al. |
| 5,845,480 A | 12/1998 | DeFreitas et al. |
| 6,322,353 B1 * | 11/2001 | Stalder et al. ............... 431/263 |

FOREIGN PATENT DOCUMENTS

| | | |
|---|---|---|
| DE | 241457 A1 | 12/1986 |
| DE | 3841269 A1 | 6/1989 |
| DE | 2839703 C2 | 7/1991 |
| DE | 4320429 A1 | 12/1994 |
| EP | 0992661 A1 | 4/2000 |
| GB | 743809 | 1/1956 |
| WO | 96/39578 | 12/1996 |

OTHER PUBLICATIONS

A. Lefebvre "Gas Turbine Combustion" (Arthur H. Lefebvre: Gas Turbine Combustion, pp. 222–225 and pp. 232–233, Hemisphere Publishing Corporation, 1983).

* cited by examiner

Primary Examiner—Ehud Gartenberg
(74) Attorney, Agent, or Firm—Burns, Doane, Swecker & Mathis, L.L.P.

(57) ABSTRACT

In a thermal turbomachine with a housing, a combustion chamber, an ignition device, a fuel supply, and an air supply, the ignition device includes an ignition space and an igniter arranged in the ignition space. The fuel supply and the air supply open into the ignition space. The ignition space is connected to the combustion chamber, and the ignition device is arranged outside the housing of the thermal turbomachine. A process is shown for the ignition of the thermal turbomachine outside the housing.

12 Claims, 2 Drawing Sheets

THERMAL TURBOMACHINE AND PROCESS FOR IGNITING THE THERMAL TURBOMACHINE

FIELD OF THE INVENTION

The present invention relates to a thermal turbomachine with a housing, a combustion chamber, and an ignition device, and a process for igniting the thermal turbomachine.

BACKGROUND OF THE INVENTION

In order to start a continuous chemical reaction, the combustion chambers of furnaces and gas turbine plants are in general ignited by means of so-called ignition aids. In particular, electrical ignition or glow plugs are known for this purpose; however, a gas flame (ignition torch) is also frequently used.

Auxiliary burners are mostly used first, which then light the main burner. In gas turbines the main fuel is also partially used for the ignition burner, i.e., according to the case of application, fuel oil, kerosene or natural gas. Easily storable auxiliary gases such as propane, for example, are of course also occasionally applied.

Successful ignition by means of the ignition aids depends on numerous factors. Among these are the inlet conditions of the combustion air, such as pressure, temperature and velocity, the ignition fuel used and its conditions, the geometry and makeup of the combustion chamber, and finally also the composition of the combustion air.

The ignition of combustion chambers in thermal turbomachines, such as, for, example, in gas turbines, by means of an ignition plug or glow plug, is described in, among others, A. Lefebvre in "Gas Turbine Combustion" (Arthur H. Lefebvre: *Gas Turbine Combustion*, pages 222–225 and pages 232–233, Hemisphere Publishing Corporation, 1983).

As a matter of course, a condition for the function of the ignition device is that conditions are present at the igniter which make it possible for a stable and sufficiently powerful ignition flame to arise. To be mentioned here in particular are the adjustment of the fuel-air ratio and also an appropriate slow speed in the region of the igniter.

These conditions can often be fulfilled in the combustion chambers of gas turbines only by the use of special ignition burners. The igniter is therefore frequently installed in a small ignition space, so that only a small volume has to be ignited by the initial ignition. A stable ignition flame arises in succession in a flame tube situated downstream of this ignition space.

Such an ignition system for gas turbines is known from the document EP-A1-992 661. Other igniters are known from, e.g., U.S. Pat. Nos. 2,967,244, 3,404,939, 5,368,474, or from the international publication WO 96/39578. A burner with an ignition device for gaseous fuels and oxygen is also described in the document DD 241 457. Furthermore, a process for igniting the main flame of a combustion chamber is known from the document DE-A1 4 320 429.

Under the conditions which are present in the combustors of modern gas turbines, the ignition system requires a high maintenance cost to preserve its reliable functioning over a long period. In all the above-mentioned documents, this in particular takes place by the arrangement of the igniter in the immediate neighborhood of the combustion chamber and of the high thermal loading associated therewith. Since the ignition takes place in the interior of the thermal turbomachine the high voltage has to be conducted there through the air channel of the compressor exit air. High temperatures likewise prevail here, so that a corresponding ceramic insulation has to be provided for the current-carrying parts.

The life of the igniter is thus limited by the high stress on the materials used, the thermal gradients and transients which arise, and also by vibrations.

Known glow cylinders used in automobile construction and not requiring such highly efficient insulation because of their low electrical voltage cannot be used, because they change over time during the operation of the machine, due to the high combustion chamber temperatures.

SUMMARY OF THE INVENTION

In view of the above-discussed disadvantages encountered in the prior art, the invention increases the total life of the igniter by a reduced thermal loading, in a thermal turbomachine with a housing, a combustion chamber, and an ignition device. The invention also provides a process for the ignition of the thermal turbomachine, by means of which the life of the igniter is increased.

The ignition device is arranged outside the housing of the thermal turbomachine and is connected to the combustion chamber by an ignition tube. The process for the ignition of the thermal turbomachine according to the invention includes a fuel/air mixture being introduced into the ignition space and the ignition tube, the fuel/air mixture being ignited in the ignition space outside the housing of the thermal turbomachine, and the ignition flame is led through the ignition tube into the combustion chamber.

The fuel/air mixture is mixed in the ignition space and the ignition tube before the ignition. By a suitable choice of the inflow speed of the two media, air/fuel—higher than the flame speed—the ignited flame then runs through the ignition tube toward the combustion chamber. The flame is stabilized there due to the widening of cross section. The ignition of the main burner then takes place by means of the ignition flame burning in the combustion chamber. By this arrangement and by this process, the thermal load on the igniter, the electrical parts and all the ducts, is reduced in all, since the igniter is outside the housing and thus not exposed by the combustion chamber to high temperatures. Furthermore, the ignition elements are not exposed to the high thermal radiation of the flame, nor to hot gases of the combustion chamber sweeping past them.

In an advantageous embodiment, the ignition tube can be directly connected to the main combustion chamber. For better ignition, the ignition point can be equipped with a widening of cross section toward the combustion chamber. It is also conceivable to embody the transition to the ignition tube as a nozzle.

Another advantageous embodiment consists of arranging the cross section widening for stabilizing the ignition flame, not directly on the combustion chamber wall, but stepped in the form of a flame tube between the combustion chamber and the ignition tube. This can be connected such that the flame tube is connected, via at least a further duct to each of the fuel supply and the air supply, so that the ignition flame is conventionally supplied with fuel and combustion air within the gas turbine. In particular, this has the advantage that the fuel/air amounts of the igniting torch can be adjusted independently of the amount of fuel of the ignition tube. The ignition of the ignition burner of course takes place outside the machine, through the ignition tube which is filled with combustible mixture. The ignition flame runs through the ignition tube toward the combustion chamber and there ignites the separately supplied fuel/air mixture. The filling of the ignition tube correspondingly takes place only once for the production of the ignition flame. After this, fuel and/or air can be supplied to the combustion chamber by means of the ignition tube.

The igniter itself has to ignite only a small volume of mixture. Thus the minimum energy to be applied for a reliable initial ignition is reduced. The ignition flame thus arising passes from the ignition space through the ignition tube into the flame tube, or directly into the combustion chamber, where it ignites the fuel-air mixture present there, so that finally a main ignition flame arises for the whole combustion chamber.

In an embodiment of an ignition device according to the invention, the flow of fuel and air around the igniter is effectively decoupled from parameters such as the pressure in the combustion space and the initial pressure of air and fuel. Good ignition conditions can thus be ensured directly at the igniter over a wide operating range of the ignition device.

A mixing chamber into which the fuel supply and the air supply open can advantageously be arranged before the ignition space, so that an improved mixing and a reliable ignition can take place.

The igniter can be embodied as a glow igniter or as a spark igniter. Aging processes due to thermal action no longer play any part.

For reliable ignition, the ignition space and/or the ignition tube can be catalytically coated, and also suitable ignition aids (oxidizers, easily ignited reaction materials, etc.) can be used. For the same purpose, the ignition flame can be stabilized by swirl at the outlet of the ignition tube.

BRIEF DESCRIPTION OF THE DRAWINGS

The invention is described in detail hereinafter using the Figures.

DETAILED DESCRIPTION OF THE INVENTION

Figure 1:
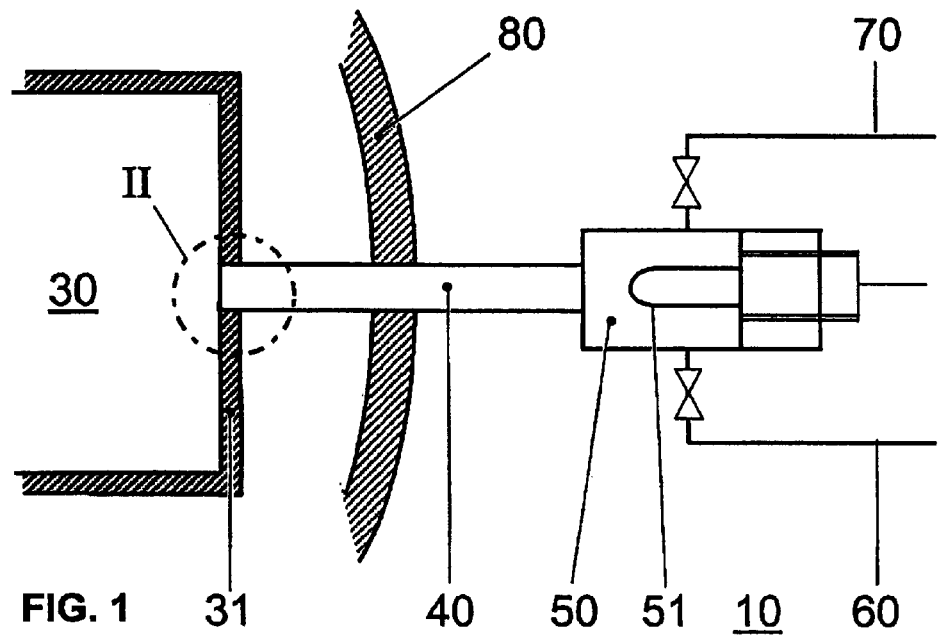
FIGS. 1, 3, and 4 are, respectively, diagrams of first, second and third embodiments of a thermal turbomachine according to the invention, with a housing, a combustion chamber and an ignition device; and, FIG. 2 is an enlarged view of section II in FIG. 1, showing an altered geometry of the transition from the ignition tube to the combustion chamber.
Figure 3:
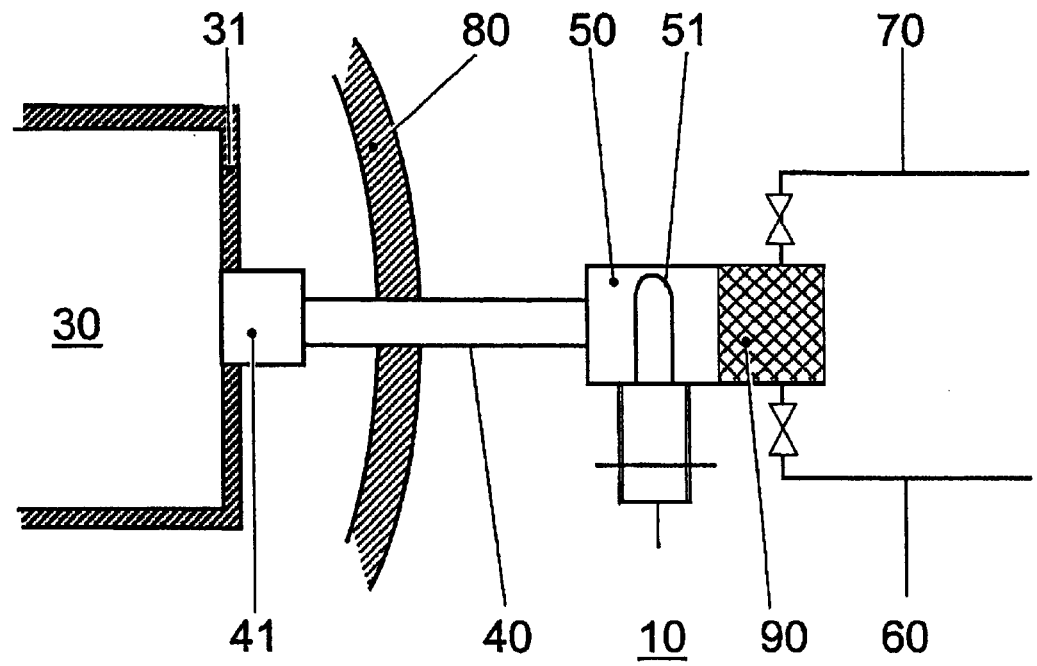
Figure 4:
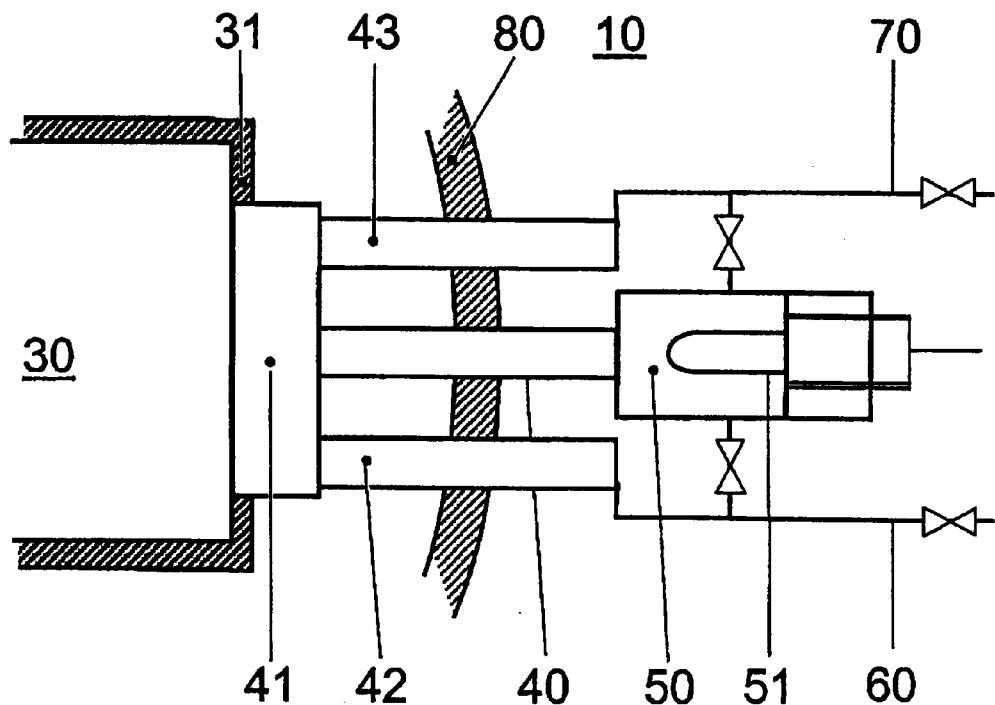

An example of a thermal turbomachine according to the invention with a housing 80, a combustion chamber 30, a combustion chamber wall 31, an ignition device 10, a fuel supply 60 and an air supply 70 is shown schematically in FIGS. 1, 3 and 4. The ignition device 10 consists of an ignition space 50 and an electrically operated igniter 51 arranged in the ignition space 50. The ignition space 50 is arranged, according to the invention, outside the housing 80 of the gas turbine and is connected to the combustion chamber 30 via an ignition tube 40. The thermal loads on the igniter 51, electrical parts, and all leads are in all advantageously reduced by this arrangement, since the igniter 51 is arranged outside the housing 80 and is thus not exposed to high temperatures by the combustion chamber 30. Furthermore, the ignition elements are not exposed to the high thermal radiation of the flame, nor to hot gases of the combustion chamber 30 flowing past them.

Figure 2:
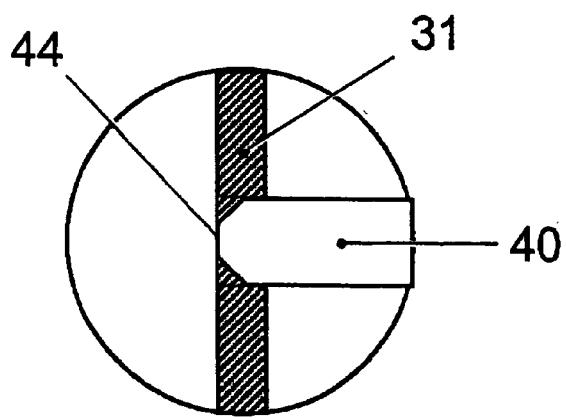

The ignition space 50 is connected to a fuel supply 60 and to an air supply 70. A fuel-air mixture is supplied to the ignition space 50 and the ignition tube 40 by means of these ducts, and can be ignited by the igniter 51. After ignition has taken place, the resulting flame propagates through the ignition tube 40 toward the combustion chamber 30. Because of the gradients of fuel/air ratio which are present, the ignition flame arrives with certainty at a region in which a particularly inflammable mixture is present. Reliable ignition is attained by means of this functional principle over a particularly large range of fuel/air ratios of the ignition device. Moreover, the flame is impelled toward the combustion chamber 30 by the flow speed of the inflowing fuel/air mixture. This ignition flame then ignites the flame in the main combustion chamber. As shown in FIG. 1, this can be possible by direct connection of the ignition tube 40 with the combustion chamber 30. The transition from the ignition tube 40 to the combustion chamber 30 is embodied as a cross section widening. A stabilization of the flame occurs due to this cross section widening. As can be seen in FIG. 2, which shows the section II of FIG. 1, the transition from the ignition tube 40 to the combustion chamber 30 as a cross section widening can be equipped with a nozzle 44 present there.

In another advantageous embodiment, which can be seen in FIG. 3, the cross section widening for stabilization of the ignition flame is not arranged directly at the combustion chamber wall 31, but is stepped in the form of a flame tube 41 between the combustion chamber wall 31 and the ignition tube 40. This serves for preliminary stabilization of the flame before the combustion chamber 30 is reached. As can likewise be seen in FIG. 3, a mixing chamber 90, into which the fuel supply 60 and the combustion air supply 70 open, can advantageously be arranged before the ignition space 50, so that an improved mixing and a more certain ignition can take place.

In another embodiment, as shown in FIG. 4, the flame tube 41 is connected via at least one respective further duct 42,43 to the fuel supply 60 and the combustion air supply 70, so that the ignition flame is conventionally supplied with fuel and combustion air in the interior of the gas turbine. In particular, this has the advantage that the fuel/air amounts of the ignition flame can be adjusted independently of the amount of fuel of the ignition tube 40. The ignition of the ignition burner naturally takes place outside of the burner by means of the ignition tube 40, which is filled with ignitable mixture. The ignition flame runs through the ignition tube 40 in the direction of the combustion chamber 30 and there ignites the separately supplied fuel/air mixture. Correspondingly, the filling of the ignition tube 40 takes place only once for the production of the ignition flame. After this, fuel and/or air can be supplied to the flame tube 41 via the ignition tube 40.

With the various embodiments of the thermal turbomachine according to the invention, the flow of air and fuel around the igniter 51 is effectively decoupled from parameters such as the pressure in the combustion chamber and the initial pressure of air and fuel. Good ignition conditions can be ensured directly at the igniter 51 over a wide range of operation of the ignition device.

The igniter 51 can be embodied as a glow igniter or as a spark igniter in all of the mentioned embodiments. Advantageously, ageing processes due to the thermal effect of the combustion chamber 30 no longer play a part.

For reliable ignition, the ignition space 50 and/or the ignition tube 40 and/or the igniter 51 can be catalytically coated, and also suitable ignition aids (oxidizers, easily ignited reaction materials, etc.) can be used. For the same purpose, the ignition flame can be stabilized by swirl at the outlet of the ignition tube 40.

What is claimed is:

1. A thermal turbomachine comprising:
    a housing, a combustion chamber, an ignition device, a fuel supply, and an air supply, the ignition device comprising an ignition space and an igniter arranged in the ignition space;
    the fuel supply and the air supply opening into the ignition space;
    the ignition space being connected to the combustion chamber; and
    the ignition device is arranged outside the housing of the thermal turbomachine and is connected to the combustion chamber by an ignition tube.

2. The thermal turbomachine according to claim 1, wherein:
    the combustion chamber is directly connected to the ignition tube, and the transition from the ignition tube to the combustion chamber has a widening cross section, with or without a nozzle.

3. The thermal turbomachine according to claim 1, wherein a flame tube is arranged between the ignition tube and the combustion chamber, and the flame tube has a widening cross section with respect to the ignition tube.

4. The thermal turbomachine according to claim 3, wherein the flame tube is connected by at least one further duct each to the fuel supply and to the air supply.

5. The thermal turbomachine according to claim 1, wherein a mixing chamber is arranged upstream of the ignition space, and the fuel supply and the air supply open into said mixing chamber.

6. The thermal turbomachine according to claim 1, wherein the igniter is embodied as a glow igniter or as a spark igniter.

7. The thermal turbomachine according to claim 1, wherein at least one of the igniter, the ignition space and the ignition tube are catalytically coated.

8. A process for the ignition of a thermal turbomachine with a housing, a combustion chamber, an ignition device, a fuel supply, and an air supply according to claim 1,
    wherein a fuel/air mixture is introduced into the ignition space and the ignition tube, the fuel/air mixture is ignited outside the housing of the thermal turbomachine in the ignition space, and the ignition flame is impelled through the ignition tube into the combustion chamber and there ignites a fuel/air mixture in the combustion chamber.

9. The process for the ignition of a thermal turbomachine according to claim 8, wherein the ignition tube is used only once for the ignition of the combustion chamber and thereafter at least one of fuel and air are supplied through the ignition tube to the combustion chamber or to a flame tube arranged between the ignition tube and the combustion chamber.

10. A process for the ignition of a thermal turbomachine according to claim 8, wherein fuel and air are supplied by at least one duct to a flame tube arranged between the ignition tube and the combustion chamber.

11. A process for the ignition of a thermal turbomachine according to claim 8, wherein the ignition flame is stabilized by swirl at the outlet of the ignition tube.

12. A process for the operation of a thermal turbomachine according to claim 8, wherein ignition aids are used for reliable ignition of the fuel/air mixture.

* * * * *